3,492,127
PROCESS FOR PREPARING A STABILIZED BAKERY PRODUCT
Frederick M. Ketch and Ralph L. Barton, Battle Creek, Mich., assignors to General Foods Corporation, New York, N.Y., a corporation of Delaware
No Drawing. Filed Sept. 27, 1966, Ser. No. 588,658
Int. Cl. A21d 13/08
U.S. Cl. 99—86                                    3 Claims

ABSTRACT OF THE DISCLOSURE

A non-refrigerated, ready-to-bake pastry product is presented comprised of a filling portion having a moisture equilibrium level of less than 15% and a dough portion having a moisture equilibrium level of less than 15%, said product being packaged in a moisture impermeable container and said dough portion having a moisture content of 15–21% when packaged.

---

This invention relates to the art of stabilized bakery products and more particularly is concerned with a bakery product having prolonged non-refrigerated shelf life.

In the art of preparing ready-to-bake bakery products having a crust dough portion in proximate relation to a filling portion, prior workers have attempted to compound filling products which are shelf stable and yet do not require refrigeration. The provision of such a product would supplant the present bakery distribution pattern of pre-baking filling-containing crust products and distributing such products on a regional basis wherein the manufacturing facility is either proximate to the market or the marketing of the product contemplates a reduced inventory period. Presently pre-baked or partly baked pies are distributed in a frozen condition and stored in the retail outlet at sub-freezing temperatures.

A process has now been developed which permits the national distribution of a ready-to-bake bakery product having a crust dough, such as a pie or other filling-containing crust dough comestible; the product is storable under non-refrigerated conditions and hence can be vended in retail outlets at ambient room temperatures typically below 90° F. while enjoying prolonged shelf life which from a practical standpoint in a national distribution pattern is in the neighborhood of three to six months. The product of the present invention is a product adapted to be rehydrated by the consumer by addition of aqueous liquids to the filling constituents intermediate the crust dough therefor and upon baking provide an ideal crust texture and highly flavorful filling which typically will be composed principally of fruit, such as apples, cherries, peaches, blueberries, etc.

The provision of shelf stable ready-to-bake pie crust doughs has been suggested in the prior art, but each of these respective teachings, so far as is presently known, has not advanced the art to a point where a bakable shelf-stable product of good eating quality is afforded. Some conceived of drying both the crust dough portion and a filling portion to a moisture content of say less than 5%, whereby stability of non-refrigerated storage conditions may be afforded due to the low moisture content; such a product would be rehydrated by adding water through a perforation in the crust dough prior to baking and relying upon the baking operation to achieve completion of filling and crust hydration to an edible condition. However, the dough crust of such a ready-to-bake pie product does not typify a good "flaky" pie crust; reduction of crust dough moisture to less than 5% for packaging yields a crust which upon baking in the presence of a rehydrated filling is mealy and not truly characteristic of preferred pie crusts; it appears that through the necessary moisture reduction to achieve stabilization the crust dough undergoes an irreversible change in the physical character thereof which cannot be restored simply by baking in the presence of an aqueous liquid.

In accordance with the present invention, a crust dough formulation is compounded having an equilibrium moisture content greater than 8% and less than 15% and which is packaged in combination with a dehydrated filling portion at an initial moisture content in excess of 15%; typically, the crust dough portion will have an equilibrium moisture content in the preferred range of 10–13%, the crust dough portion having been worked preparatory to combination with the fruit or other filling at a moisture content whereat good crust dough and crust characteristics per se are achieved as will be discussed hereinafter; typically, the crust dough preparatory to packaging will have an original moisture content in the order of 17% and, in any event less than 21%. The appropriate formulation of the crust dough will include lubricants and humectants, as will be discussed hereinafter; various dough crust attributes are thereby provided which render the crust dough of optimal functionality in respect of package stability and good baking quality. The crust dough formulation will be of such moisture content preparatory to being packaged with the filling components that the crust dough will undergo a predetermined reduction in moisture content to the aforestated equilibrium moisture range, which reduction will occur by reason of transfer of water vapor to the filling constituents.

In this respect there are two critical features of the present invention. Firstly, the composite crust dough and dehydrated filling must be packaged in a substantially moisture impermeable packaging material whereby moisture will not migrate substantially through the packaging barrier to any large degree and typically the barrier will be capable of providing a limitation of moisture migration, if any, preferably less than 1% over an anticipated shelf life of six months; commonly, it will be found desirable to employ a packaging material which limits moisture transfer to the extent that it takes place only between the product and the atmosphere surrounding it within the package, and the dehydrated filling adjacent to it.

The second essential feature of the present invention is the dehydration and/or formulation of the filling component to an over-all moisture content prior to said packaging whereby the filling will have an overall average moisture content less than 6%, and more commonly less than 4%, preferably about 2%, the filling moiety of the product, as packaged, having an equilibrium moisture content less than 15% during storage.

From the foregoing it will be apparent that by the employment of a substantially moisture impermeable packaging material as aforesaid, an interplay of moisture equilibrium forces will transpire when the filling component and the crust dough component are integrated within the package; the crust dough having been formulted at a moisture content in excess of 15%, but having an equilibrium moisture content in said package less than 15%, will undergo a transfer of water vapor to the filling component; the latter having been formulated at a moisture content of less than 6% and typically in the neighborhood of 2% moisture will undergo an uptake of water vapor, but having been formulated so as to have an equilibrium moisture content of less than 15% under the aforedescribed packaging storage criteria will not undergo a moisture pick-up such that the filling will have a moisture content in excess of 15%.

In this way, the filling portion will not display premature development of either non-enzymatic and enzymatic browning of the filling constituents as well as other oxidative changes which give rise to development of undesirable flavors and/or colors as well as the proliferation of micro-organisms in the filling constituents.

To achieve the best mode of providing a dough crust having the aforestated parameters of packaging stability and which will also bake to a crust having optimal quality, a number of processing techniques are employed; the most important of these are two, namely, (a) inclusion of a lubricating polyhydric alcohol texturizing agent typified by glycerol and other non-reactive carbonyl-free polyhydroxy material, such as sorbitol and other higher sugar alcohols and polyols, and (b) employment of a reducing compound, preferably a sulphur-containing one and most preferably a sulphite capable of a reduction of the disulphide linkages native to the gluten portion of farinaceous cereal such as wheat gluten.

In addition, the shortening constituent should be strategically located with respect to the farinaceous constituent of the crust dough so as to only partially coat said farinaceous constituency and thereby modify the ability of the crust dough to absorb moisture to a lesser degree during the crust dough preparation; in this way, the rehydrating fluids added to the ready-to-bake product will be desirably absorbed by the crust dough incident to baking thereof and crust development to result in a flaky, as distinguished from the mealy type crust, that is, one wherein the crust has long flakes when broken and tends to exhibit fracture along lines rather than crumble as in the case of a more mealy crust.

In accordance with a preferred mode for crust dough formulation and manufacture, plastic shortening at a minor level of the total crust dough shortening level and the farinaceous starch-containing constituent, e.g., soft wheat flour, are preblended under conditions which cause the shortening to be distributed over the farinaceous ingredients so as to coat the surfaces of the same to the extent of providing a greasy feel when the thus coated flour particles are handled, the thus shortening-coated flour particles having the tendency to adhere slightly. Such distribution of shortening over the surface of the flour is advantageously effected by having plastic shortening cut into the flour as a minor percent by weight thereof and mixed in a mechanical device until the shortening is in small discrete lumps. Thereafter the shortening and flour mixture are subjected to impacting in a suitable device such as a hammer mill or an entoleter whereby the shortening is caused to undergo plastic flow over the individual particles of the farinaceous material while remaining in a substantially congealed state. In this manner the water absorptive properties of the farinaceous ingredient is modified so that moisture pick-up and subsequent crust dough development is minimized and gluten development thereof curtailed.

After such distribution of the shortening with respect to the farinaceous material which preferably is a soft wheat flour, although any cereal flour may be employed the major percent of the shortening that is incorporated into the crust dough composition is cut into the aforesaid preblend to the extent necessary to achieve a typical dough crust texture. Generally, the shortening level in the total crust dough on a weight basis is in the neighborhood of 25-40%, the preblend will have shortening as a minor fraction thereof as well as a minor fraction of the total shortening level, a shortening content in the preblend in the neighborhood of 5-15%, being typical.

After this cutting operation a slurry containing a glutenous high protein farinaceous material such as a high strength hard wheat flour having, say a protein content in excess of 8% and typically in the neighborhood of 12%, is added to produce a dough. Preferably, and in accordance with the overall precepts of this invention, a lubricating edible polyhydric alcohol humectant such as glycerol, sorbitol or the like is incorporated in the dough to facilitate development thereof to the extent of distributing the farinaceous material and the shortening with respect to one another under conditions wherein crust dough is characterized by the presence of discrete particles of plastic shortening. Although glycerol or some other non-aqueous lubricating medium is preferred for facilitating this purpose, it is not essential and any means which will distribute the second mentioned so-called outer shortening phase discretely throughout the aforesaid preblend may be employed. Advantageously, by employing the glycerol, distribution of the shortening with respect to the total dough constituents is facilitated to the extent that moisture present in the dough will not occasion the development of excessive gluten strength and thereby detract from crust texture; in practice the glycerol or other lubricating humectant will be added as part of the aforesaid aqueous slurry and hence will serve to control dough hydration as described hereinabove.

By thus incorporating the glutinous slurry, the requisite adhesion of the dough constituents, i.e., the surfaces of the farinaceous material is afforded so as to provide a coherent worked dough mass which lends itself to shaping, cutting and mechanical handling generally while at the same time avoiding excessive hydration of flour protein and total elimination of discrete shortening particles which are desired in order to result in the preferred flaky baked dough crust texture.

Collaterally and advantageously, the sulphite-containing compounds also serve to control the extent of dough working required to effect protein hydration incident to dough development; such overworking of the dough can result in reduction of the desired discrete condition of the shortening. Due to the sodium bisulphite and like sulphur-containing reducing substances like those set forth in U.S. Patent No. 3,149,979 to Bohn et al., dated Sept. 22, 1964, in the aqueous slurry, the cohesive action of the slurry is enhanced thereby improving mechanical dough handling characteristics, as well as providing a dough which, upon baking, provides a more flaky character. Most advantageously also, however, by incorporating such reducing agents in the dough, in the aforestated dough moisture range, color stability, that is, prevention of premature non-enzymatic browning, is realized such that the crust dough does not undergo off-color development prior to baking and instead retains the typical ivory dough appearance of a freshly made dough even after months of storage; importantly by possessing such color stability at the intermediate moisture range as described, the dough crust produced upon baking is uniform and not unduly darkened due to excessive development of color producing browning reaction precursors during storage. Of like importance is the fact that it has been found the bisulphites, in particular, prevent the development of off-odors and flavors stemming from such precursors which might otherwise arise should the crust dough be packaged for too long a period of time.

Hence, it will be seen from the above that the use of a polyhydric alcohol lubricating medium such as glycerine conjointly with a sulphur-containing reducing compound at the reduced moisture content specified, permits the development of a preferred crust dough which is stable under non-refrigerated storage conditions and fully meets the intended objects of the invention set forth herein.

On the other hand, the invention is not be restricted in its broadest aspects to this preferred series of processing additives and dough working techniques, inasmuch as the benefits of stability during non-refrigerated storage and the creation of an over-all acceptable crust representing an improvement over other prior art workers will be realized when reducing compounds are not overtly added and/or the dough working principle as set forth hereinabove is not followed.

Inasmuch as the dough formulation called for in meeting the afore-described equilibrium conditions is not typical but rather should have a moisture content less than 21%, it has been found desirable to employ the aforedescribed processing techniques in the provision of a crust dough portion which, by virtue of the formulation, can be readily worked and shaped, and secondly, will bake to the desired texture. To explain, by the incorporation of a lubricating medium such as glycerol, a moisture reduction in the aforestated range, i.e., above 15% and less than 21%, can be practiced while at the same time permitting the distribution of the farinaceous starch-containing material shortening in the water in crust development. Secondly, by employment of one of the aforesaid reducing substances, development of a glutinous or cohesive nature to unacceptable extent is forestalled. Advantageously, there is a mutual contribution of these two agents, one to another, in promoting their respective functions in such an atypical crust dough formulation; by employing a lubricant, the amount of mechanical handling and work that would otherwise be applied to effect the desired distribution of shortening with respect to the flour compensates for the loss in lubricity that would otherwise stem from the reduction of the content of the formulation; this, in turn, offsets the tendency to overwork and hence overdevelop the glutinous or cohesive character of the crust dough formulation; likewise, through the employment of the aforesaid lubricating medium as well as the use of the aforesaid reducing substances, premature shortening liquification is avoided whereby the shortening will be caused to only partially coat the farinaceous material. This is preferably effected by employing a brief high speed shearing mixing technique whereby the shortening constituent is caused to coat the low protein moiety of the farinaceous material whereby a less hydratable crust dough component is achieved. By observing the foregoing criteria for the crust dough, which can be characterized as being in an intermediate reduced moisture range relative to typical crust doughs of prior art, it is still possible to achieve the desired flakiness through provision of a tender flaky baked crust as will be apparent to those skilled-in-the-art from a review of the operative examples hereinafter described.

The filling component of use in the present invention will preferably be of the fruit type and will be typified by a sliced apple, whole cherry, sliced peach, and whole blueberry to which fruit will preferably be added seasoning or flavorants well known to skilled bakers. The fruit, as indicated above, will be dehydrated to a substantially stable moisture and preferably in doing so, will be desiccated by means wherein the fruit is not in a shrunken state but rather undergoes a minimum of shrinkage incident to dehydration. Typically, this will be effected by such dehydrating techniques as freeze-drying, vacuum puff drying, combination air drying and freeze-drying or vice versa, all under conditions wherein a desiccated product of low density is afforded. In this way not only is the fruit component processed so as to have good rehydration characteristics commmensurate with the anticipated baking period so as to be fully rehydrated as a result thereof, but also the fruit filling as assembled within the boundaries of the crust dough will occupy a substantial portion of the volume thereof, lending structural support for the crust dough per se. On the other hand, the invention is not to be restricted in scope to any particular means for effecting dehydration of fruit and indeed the composite filling and crust dough of the present invention as packaged need not above the filling constituents thereof of a bulk such as substantially occupies the volume between faces of adjacent crust dough portions, the foregoing drying techniques being preferred embodiments of filling constituent; in lieu of whole fruit or fruit sections, fruit purees and puree-sugar mixtures may be formulated, frozen and similarly dried to form a structure which will then be able to support the faces between adjacent crust dough portions.

Furthermore, the invention is not to be restricted to a fruit filling per se, but rather any filling component which lends itself to dehydration and can be rehydrated before or incident to baking may be employed as a filling component of the ready-to-bake product. Thus, freeze-dried meats and/or vegetable combinations can be employed as the filling components and substituted for the fruit therefor all within the ambit of the present invention, the filling component being similarly dehydrated to a stable moisture content of less than 6% and not having an equilibrium moisture content after six months' storage under the packaging conditions in excess of 15% moisture. Likewise, a cheese, such as cottage and other dairy type spreads of a desiccated form, may be employed with advantages either as the whole or principal constituent of the filling.

The advantages of the present invention, therefore are that it permits the packaging of a desiccated filling which upon rehydration will assume a freshness and a pleasant organoleptic quality when consumed as part of a total package wherein the filling is hydrated while the crust is developed by baking.

Whereas, the invention will be hereinafter described by a specific operative example wherein a pie in ready-to-bake form has been prepared and packaged, the invention is applicable to any other means whereby a crust dough is intimately integrated with respect to a filling component as in the case of convoluted structures, e.g., tart forms constituting a lapping of portions of the same dough crust, all of which occur to skilled bakers in the art.

The invention will now be described with reference to the immediately following operative example:

EXAMPLE I

A colored shortening is prepared by blending 100 parts of shortening with that amount of yellow color which will provide a crust dough of pleasing and uniformly creamy color. The shortening used being plasticized hydrogenated cotton seed oil having a 33° C. congeal point. An antimycotic mixture for ultimate incorporation into a crust dough is prepared from 36.36 parts sodium benzoate, 36.36 parts sodium propionate, 25.98 parts critric acid and 1.30 parts sodium bisulphite.

A premix of flour and a minor amount of a shortening for the crust dough with salt is prepared by blending in a vertical-type mixer in the proportions of 100 parts unbleached cake flour, 12 parts plasticized hydrogenated cotton seed oil, as specified herein and 2.6 parts salt; blending of these ingredients is continued until the shortening is broken into particles none of which is larger than a pea. The blended mixture is then passed once through an entoleter impact mill to smear the shortening over the surface of the flour, the thus blended mixture being uniform in appearance without lumps and being slightly sticky.

The balance of the colored shortening and the shortening-coated flour blend are then introduced into the bowl of a vertical type bakery mixer or an Artifex-type pie dough mixer in the proportions of 100 parts shortening-coated flour and 37.5 parts colored shortening. The ingredients are mixed about 40 seconds or until the shortening is uniformly distributed but pea-size lumps are still present. The mixture will not be cohesive and will be somewhat crumbly. It is held in the dough mixture until the next step, wherein a slurry is added. This slurry is prepared by blending water, hard wheat flour, glycerol and the antimycotic mixture aforesaid in a high velocity blender in the proportions shown below.

| Ingredients: | Parts by weight |
| --- | --- |
| Water | 100 |
| Hard wheat flour | 68.2 |
| Glycerol | 118.2 |
| Antimycotic-sulphite mixture | 3.5 |

The temperature of this slurry is controlled to 40° F. by the addition of ice. The slurry is next added to the flour, shortening and salt mixture residing in the dough mixer in proportions 100 parts flour, shortening and salt blend, 37.5 parts colored shortening and 36.2 parts slurry. The resulting dough is mixed about 20 seconds or until all of the slurry is incorporated. The finished dough is cohesive and pliable and can be easily formed into various dough shapes, as required by various kinds of pastry type shelf stable dough crust products and is characterized uniquely by the presence therein of discrete shortening particles.

The thus finished dough has a moisture content of 17% and may be used as a crust for a variety of ready-to-bake preparations containing dehydrated fruit fillings such as fruit pieces that have been freeze-dried, vacuum dried or air dried, pieces being preferably reduced to a moisture content less than about 4% and being located within the confines of two superposed crust doughs pressed at their perimeter into a butting, conjoined condition. In the shape of a pie, this configuration will preferably have a perforate region in the upper crust dough about ¾" square adapted to be removed and permit receipt of an aqueous fluid which rehydrates the fruit filling prior to baking. This product may then be inserted into a common household oven maintained at 375° F. for 40 minutes which will, when baked, develop the preferred flaky texture characteristic of preferred pie crusts.

The eminent stability properties of the dough and the packaged comestible made therefrom become apparent when the product is packaged in a moisture-proof polyethylene-coated aluminum foil packaging material wherein the comestible may be packaged for some 3–6 months but will not undergo premature browning or the development of offensive color or odors and rather will bake to the aforedescribed excellent bakery product.

What is claimed is:

1. The method of manufacturing a ready-to-bake comestible having an unbaked crust dough enveloping a filling portion and the combination packaged in a substantially moisture-impermeable material which comprises:
    (a) formulating an unbaked crust dough comprising about 25–40% hydrogenated cotton seed oil, about 40–60% unbleached cake flour, about 0.5–5% salt, about 5–15% hard wheat flour, about 1–5% glycerol, about 15–21% water and about 0.1–1.0% of an antimycotic-sulfite mixture;
    (b) blending ingredients of the unbaked crust dough formulation into a cohesive and pliable mass uniquely characterized by the presence therein of discrete shortening particles;
    (c) forming first and second portions of said cohesive annd pliable unbaked crust dough into suitable concave shapes to receive a filling;
    (d) formulating a filling comprising of sugar and a mixture selected from the group consisting of dehydrated fruit, dehydrated meat, dehydrated vegetables, and mixtures thereof, said filling mixture having a moisture content below about 4%;
    (e) adding said filling to the first portion of the crust dough suitably shaped to receive it therein;
    (f) covering said filling with the second portion of said crust dough whereby the filling subsequently occupies the volume between the faces of the adjacent concave shaped crust dough portions; and
    (g) packaging the crust dough and filling contained therein in a moisture impermeable packaging material.

2. The method of claim 1 wherein the crust dough is made by having a portion of the shortening present in discrete particles between the farinaceous material.

3. The method of claim 2 wherein a minor fraction of the total crust dough shortening is caused to be coated on to the dough flour preparatory to crust dough development and wherein the larger fraction of the crust dough is thereafter cut into the crust dough formulation, during dough batter hydration.

References Cited
UNITED STATES PATENTS

| | | | |
|---|---|---|---|
| 2,836,498 | 5/1958 | Fennema | 99—92 XR |
| 3,149,979 | 9/1964 | Bohn et al. | 99—92 XR |
| 3,294,547 | 12/1966 | Kooistra | 99—92 |

LIONEL M. SHAPIRO, Primary Examiner

JAMES R. HOFFMAN, Assistant Examiner

U.S. Cl. X.R.

99—92, 172